June 4, 1935.    M. S. CURTIS    2,004,038
TIMING MECHANISM
Filed Aug. 26, 1930    2 Sheets-Sheet 1
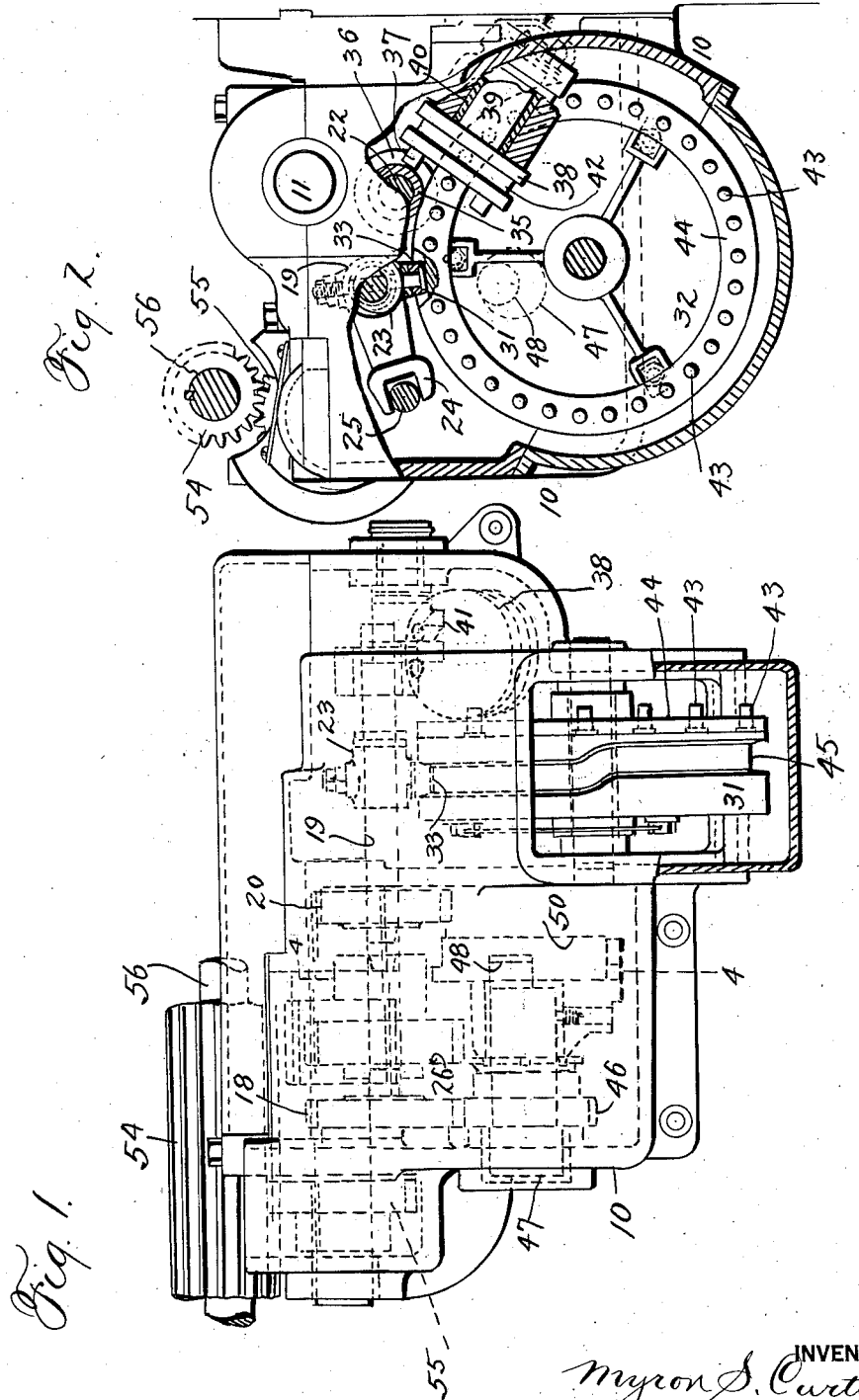
INVENTOR
Myron S. Curtis,
BY
Chas. J. Williamson
ATTORNEY June 4, 1935.                    M. S. CURTIS                      2,004,038
                                TIMING MECHANISM
                        Filed Aug. 26, 1930            2 Sheets-Sheet 2
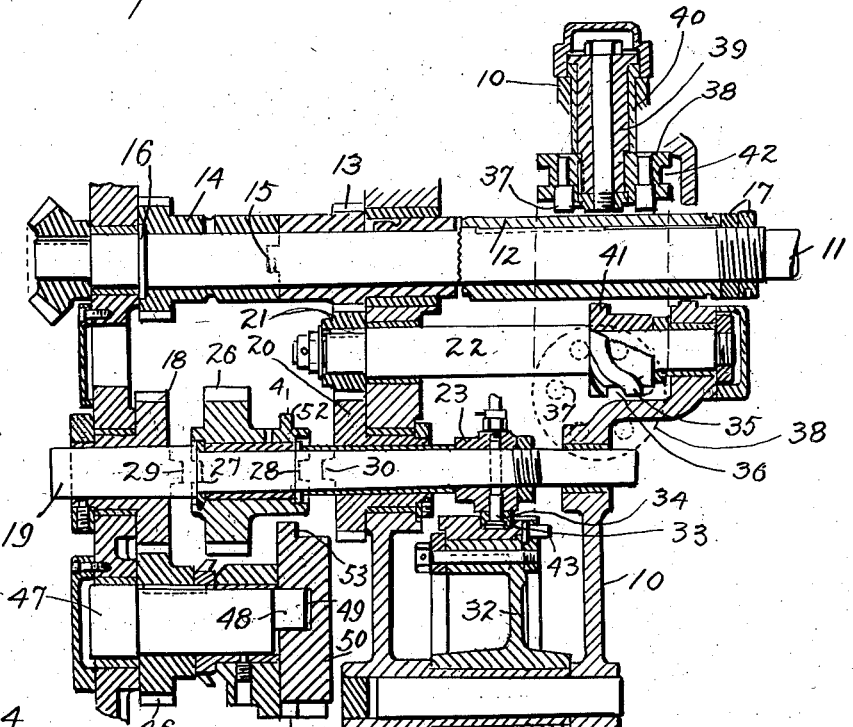
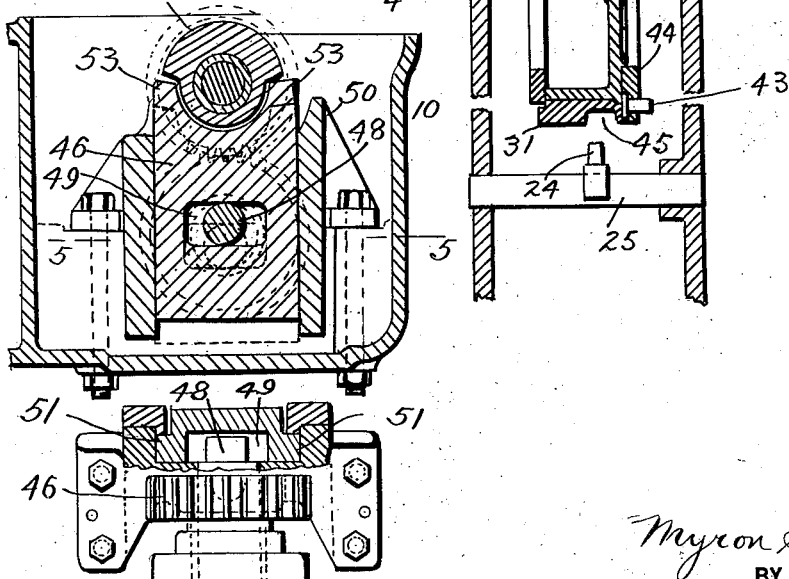

Patented June 4, 1935

2,004,038

UNITED STATES PATENT OFFICE 2,004,038

TIMING MECHANISM

Myron S. Curtis, Pawtucket, R. I., assignor to William Wallace Potter, Pawtucket, R. I.

Application August 26, 1930, Serial No. 477,881

3 Claims. (Cl. 74—323)

My invention relates to improvements of timing mechanisms such for example as are described in my U. S. Patent No. 1,211,551.

These timing mechanisms have, for their purpose, the control of the relations between two shafts, or rotating elements, one driven from the other, through a clutch by which the driven element may be clutched to or de-clutched from the driving element, or may be reversibly clutched to the driving element, so that always the two elements will have an exact relation of rotation. To maintain this relation, it is necessary that the driven element be clutched to and de-clutched from the driving element with the parts always in the same radial position and that the driven element, when de-clutched, be positively positioned and remain in this positive position while declutched.

It is also necessary, in order to obtain these results that the mechanism for clutching and de-clutching (and for counting the number of revolutions between such movements) be positively driven and controlled from the driving element.

My present invention has, for its object, the attainment of the results above set forth, and consists in whatever is defined by or is within the scope of the claims.

Referring to the drawings:

Fig. 1 is a front elevation of a so-called timing box, embodying my invention;

Fig. 2 is an end elevation with a portion of the end wall removed;

Fig. 3 is a cross section, through the gearing with the shafts displaced from their actual positions, for clarity of illustration;

Fig. 4 is a cross section on the line 4—4 of Figs. 1 and 3;

Fig. 5 is a cross section substantially on the line 5—5 of Fig. 4.

Describing the embodiment of my invention shown in the drawings by way of illustration and not limitation, a casing, 10, has rotatably located in it, the driving element or shaft, 11, which receives power from some outside source, and which has keyed to it sleeve 12, one end of which is provided with clutch teeth which mesh with corresponding clutch teeth on the hub of gear 13, which gear is connected with and drives gear 14 through tongue 15. The sleeve 12, and gears 13 and 14 are held between a collar 16 on shaft 11, and nuts 17 on the same shaft, the whole forming an assembled unit with shaft 11. Gear 14 meshes with and drives gear 18, which revolves loosely on shaft 19, which shaft is free to slide in casing 10, but is held from rotating by means presently described. Gear 13 drives gear 20 in an opposite direction to gear 18, through an intermediate pinion 21, which is keyed to shaft 22. The ratio between gears 13 and 20 is exactly the same as the ratio between gears 14 and 18. Gear 20 also revolves freely on shaft 19. Shaft 19 has pinned to it cam roll carrier 23, which is provided with an extension or arm 24, the outer end of which has jaws that straddle a fixed stud 25 and thus shaft 19 is held from revolving while free to slide longitudinally.

Revolving freely on shaft 19, but fixed against longitudinal movement thereon is the driven element which is a clutch gear 26, provided on its opposite faces with single clutch tooth spaces 27 and 28, which respectively may be caused to mesh with single teeth 29 and 30 one each on gears 18 and 20, by longitudinal movement of shaft 19. When so meshed, gear 26 is driven either in one direction by gear 18 or in the opposite direction by gear 20. Longitudinal movement is imparted to shaft 19, by cam 31, keyed to spider, 32, and acting on roll 33 on cam roll stud 34, secured to cam roll carrier 23.

Cam spider 32 and, therefore, cam 31, receive intermittent motion from drive shaft 11. To accomplish that a cam 35, is keyed to shaft 22, (and therefore, positively driven by shaft 11, through gears 13 and 21) whose cam path 36 coacts with pins 37 on cam 38 keyed to stud shaft 39 which revolves in bushing 40 located in casing 10, in such a way that one revolution of shaft 22 causes an intermittent motion of cam 38, equal to the angle between two adjacent pins and this intermittent movement takes place during the same angular movement of shaft, 22, so that while cam 38 is indexing, it revolves at the same speed as shaft 22 and when through indexing, is locked stationary, by land 41 on cam 35. Cam 38 has on its periphery cam path 42 which meshes with pins 43 on plate 44, which is fastened to cam spider 32 and, therefore, cam 38 indexes cam spider 32 in the same way as it is itself indexed by cam 35. Accordingly, cam spider 32 is indexed one pin during a very small part of a rotation of shaft 22 and remains locked stationary until its next index, and, as cam path 45 in cam 31 is so formed as to have its complete throw during one index, it is apparent that gear 26 will be clutched to, or de-clutched from either gear 18 or gear 20 in a very small portion of their revolution and always exactly the same radial position of the single clutch teeth 29 and 30.

Meshing with gear 18 and driven from it, is gear 46 keyed to shaft 47, the end of which 48 is an eccentric which coacts with slot 49 of a sliding block 50 in ways 51, and thus as shaft 47 revolves, block 50 is caused to reciprocate in ways 51. Gear 26 has a flange 52 which partially surrounds it through substantially a half circle and which is in line with jaws 53, of block 50, when gear 26, is in a neutral position, but is clear of jaws 53 when gear 26 is clutched to either gear 18, or gear 20.

The positive gear connections are so arranged that gear 26 is shifted into neutral with the flange 52 in the position shown in Fig. 4, and when block 50 is in its low position so that jaws, 53, are in the position shown by the dotted lines, Fig. 4. Such jaws are quite clear from flange 52. However, as shaft 11, continues to revolve, block 50 is moved to the position shown in full lines in Fig. 4, and if, for any reason such as momentum, gear 26 has revolved beyond the central or neutral position, it is recentered by jaws 53 engaging the lower end of flange 52, and thereby rocking gear 46. Any radial displacement of gear, 26, while it is in the neutral position is immediately corrected by jaws 53.

The machine with which my timing box is shown in the drawings to be associated, includes a long pinion, 54 (see Figs. 1 and 2) which is in mesh with a gear, 55, forming the part of a train not requiring further description with which connection with the timing box is made. The pinion 54, is elongated because it is connected with a to and fro moving member of the machine (not shown) so that at all points in such movement it will remain in mesh with gear, 55. Pinion 54, is slidable on a shaft, 56. Power is supplied from gear 26 and transmitted therefrom to gear 55.

What I claim is:—

1. A mechanism for timing rotatable driving and driven members, comprising such members, means to connect and disconnect them including a rotatable clutch element, and timed automatic means to assure the same angular position of said element when de-clutched from the driving member, and having means for locating and holding the driven member in a definite position, while declutched from the driving member, comprising a to and fro moving block having jaws, opposite jaw-engaged surfaces on said driven member, and means deriving motion from the driven member to reciprocate said block.

2. The combination of a driving shaft, a rotatable axially shiftable clutch element, a coacting clutch element alining therewith, means to shift said axially shiftable clutch element, including a rotatable cam, an intermittently acting connection between said cam and said driving shaft, and means deriving motion from said driving shaft to assure the same angular position of said shiftable clutch element when in declutched position.

3. A mechanism of the character described comprising driving and driven members, a clutch having interlocking elements interposed between said members for clutching and declutching the same and means for aligning said members in clutching position when said members are declutched, the said means comprising jaw-engaging surfaces on one of said members, a block provided with jaws for engaging said surfaces, and means for reciprocating said block to cause said jaws to periodically engage said surfaces.

MYRON S. CURTIS.